(12) United States Patent
Yost et al.

(10) Patent No.: US 9,610,701 B1
(45) Date of Patent: Apr. 4, 2017

(54) POCKET HAND SAW WITH LIMB EXTENDER

(71) Applicants: Chad Yost, Mio, MI (US); Tim Yost, Mio, MI (US)

(72) Inventors: Chad Yost, Mio, MI (US); Tim Yost, Mio, MI (US)

( * ) Notice: Subject to any disclaimer, the term of this patent is extended or adjusted under 35 U.S.C. 154(b) by 172 days.

(21) Appl. No.: 14/679,212

(22) Filed: Apr. 6, 2015

Related U.S. Application Data

(63) Continuation-in-part of application No. 61/976,182, filed on Apr. 7, 2014.

(51) Int. Cl.
| | |
|---|---|
| *B26B 5/00* | (2006.01) |
| *B25G 1/04* | (2006.01) |
| *B25G 1/08* | (2006.01) |
| *B27B 21/04* | (2006.01) |
| *B23D 49/14* | (2006.01) |

(52) U.S. Cl.
CPC ............. *B27B 21/04* (2013.01); *B23D 49/14* (2013.01); *B25G 1/04* (2013.01); *B25G 1/08* (2013.01); *B26B 5/00* (2013.01)

(58) Field of Classification Search
CPC .... B26B 5/00; B25G 1/04; B25G 1/08; B23D 49/14; B27B 21/04
USPC .......................................... 30/125, 151, 296.1
See application file for complete search history.

(56) References Cited

U.S. PATENT DOCUMENTS

| | | | | |
|---|---|---|---|---|
| 2,966,931 A * | 1/1961 | Dreier | .................... | B23D 49/14 279/58 |
| 4,411,068 A * | 10/1983 | Theodorides | .......... | B23D 49/14 30/166.3 |
| 4,716,653 A * | 1/1988 | Skyba | ...................... | A01G 3/08 16/DIG. 25 |
| 5,657,541 A * | 8/1997 | Hickok | .............. | A61B 17/3213 279/46.4 |
| 5,694,695 A * | 12/1997 | Lund | ........................ | B25G 1/04 15/144.4 |
| 5,911,481 A * | 6/1999 | Yost | ........................ | B23D 51/01 30/125 |
| 6,422,780 B2 * | 7/2002 | Chen | .................... | A01G 3/0251 30/254 |
| 8,905,696 B2 * | 12/2014 | Lapointe | .................. | B25G 3/00 16/426 |
| 9,288,947 B1 * | 3/2016 | Burnette | ................ | A01G 3/083 |

* cited by examiner

*Primary Examiner* — Hwei C Payer
(74) *Attorney, Agent, or Firm* — Jerry Semer

(57) ABSTRACT

This invention is a small portable saw for hunters in which the blade of the saw can be stored in a watertight compartment in the handle. The handle can be replaced with an attachment that enables the saw to be attached to a tree limb. This extends the distance the saw can reach. The top of the saw includes a saw blade and a cap with a threaded opening in its bottom. The cap is designed to allow for easy removal of the saw blade. The cap can be attached to a handle that has a watertight compartment for storage of the saw blades or an attachment that enables the cap to be attached to a tree limb to extend the reach of the saw. The attachment threads into the cap and a tree limb is threaded into the attachment's bottom.

19 Claims, 12 Drawing Sheets

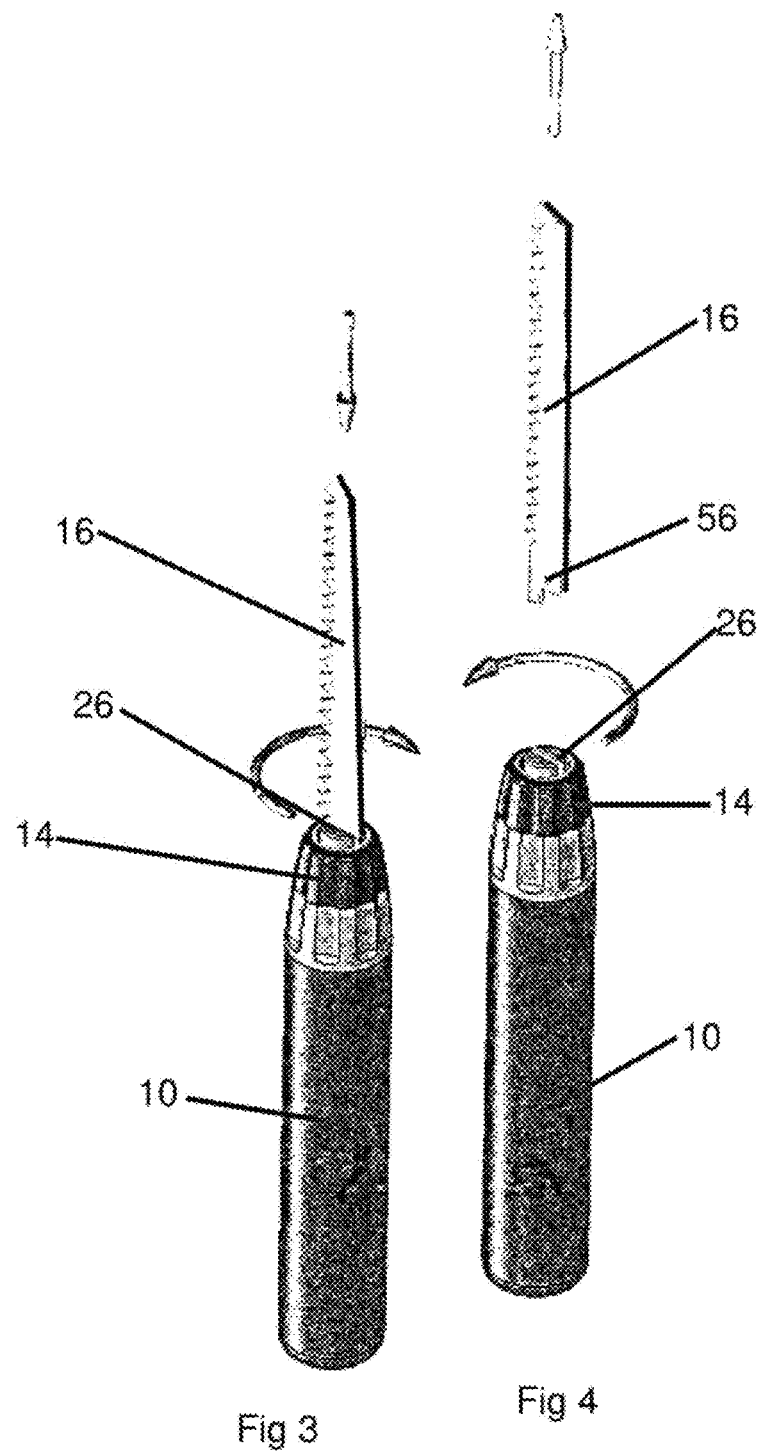

POCKET HAND SAW WITH LIMB EXTENDER

FIELD OF INVENTION

This invention relates to a pocket handsaw and more particularly to a saw that can attached to a limb to extend the saws reach.

BACKGROUND OF THE INVENTION

Sportsmen often require small hand tools for the pursuit of their chosen endeavor and in fact their lives may at times depend on such tools. Ordinary hand tools, as used by the populace, generally have been used by sportsmen, but generally they are not well adapted to such use, especially because of the lack of versatility and dependability, both of which are desirable because the tool may need to be carried a substantial distance. Thus, one of the objectives of this invention is to devise a saw that can be easily carried and is of a lightweight.

There have been attempts to do this in the prior art. One of those is Wilkens, U.S. Pat. No. 4,672,745. In this case the inventor has made a handle to which several types of saw blades attached. The problem with this invention is that there is no room in the handle to store the blades. In addition, the individual would have to carry the handle and the blades separately and there would be more possibility that the blades would be lost. Also, in case of wet weather, the blades, since they are not carried in anything, could get wet and rust. Thus, one of the objectives of this invention is to devise an easy waterproof method of storage that reduces the size of the handle plus blade. To solve this objective the applicant has placed the blade within the handle for storage. This method solves not only the objective of reducing the size of the saw when stored and carried but also in case of wet weather eliminates the problem of the blades getting wet and rusting. There have been several attempts in the prior art to put the blade in the handle. These include R. D. Philbrick, U.S. Pat. No. 2,735,463, Pape et al, U.S. Pat. No. 5,023,996, Flood, U.S. Pat. No. 4,884,307 and R. C. Dreier, U.S. Pat. No. 2,966,931. The problem with all of these patents is they call for a specially designed blade which makes the saw expensive to make and makes the blades hard to find in the marketplace. To solve this problem the applicant uses a regular saw blade that is sold for most popular brands of hands saws. Thus, the blades can be found in any small hardware store. This is especially important for sportsmen, hunters, and outdoor adventurers in that they usually venture into areas that are lightly populated and out of the way. Further, none of these inventions show a compartment for the storing the saw blade that is watertight. This is essential for the outdoor sportsmen or hunter who often in their adventure finds inclement weather.

Another objective of the invention is to design the portable handsaw such that it can be used by a sportsmen or hunter to cut limbs higher in trees then the normal reach. To achieve this objective applicant has designed a small attachment to the portable hand saw that enables the blade to be attached to a tree limb to extend the reach of the saw. This gives the adventurer the ability to cut higher and better-suited limbs for his campsite.

SUMMARY OF THE INVENTION

This invention is a small portable saw for hunters in which the blade of the saw can be stored in a watertight compartment in the handle. The handle of the saw is a tube with a closed bottom and a threaded opening on the top. The threaded opening on the top is adapted such that the saw blade will pass through and into the handle for storage. On top of the handle, a cover is placed. The cover has two parts, a threaded portion and a top cap. Said threaded portion is threaded such that it will thread over the threads of the handle. In addition, within the threaded opening, an O-ring is placed at the top so that when the cap is threaded on the handle, the O-ring will be compressed. The tightening of the cover and the handle seals the compartment and makes it watertight.

The handle and the cover are adapted to securely hold the saw blade for use. The cover has several components. The threaded portion is the bottom component of the cover. It threads to the handle. Extending from the top of the threaded portion is a cylindrical extension with a slot that extends through the center of the cylindrical extension from the top of the cylindrical extension to the top of the threaded portion. The slot splits the cylindrical extension into two wings. The slot is approximately the width of a saw blade. The saw blade fits within this slot when the saw blade is placed upon the handle for use. Within one of the extensions, an opening is bored completely through the extension.

Over top of the cylindrical extension, a cylindrical piece is placed. An opening is bored completely through the cylindrical piece on one side of the cylindrical piece. This opening aligns with the opening through one of the extensions. Around the top of the cylindrical piece is a groove for a lock ring. A second cylindrical piece is adapted to fit within the opening in the first cylindrical piece. The second cylindrical piece is cantilever in shape in that the outer circumference of the top portion of the piece is a larger then the outer circumference of the bottom of the piece. The second cylindrical piece fits within the opening in the first cylindrical piece and the opening within the extension.

Within the opening that passes through the second cylindrical piece along the length of the second cylindrical piece a rod is placed. The rod is cylindrical in shape with its front end a truncated cone and its back end semicircular.

A top cap fits over the assembly of the threaded portion, cylindrical piece, second cylinder, and rod. This top cap has an opening through the center that allows the cylindrical extensions and the first cylindrical piece to pass through the top cap. On the outer edge of the bottom of the top cap there is a cavity. Within this cavity, a spring tension piston is placed. The spring tension piston has a rounded top. This rounded top is designed to fit within indentions on the top of the threaded portion. The threaded portion has two indentions on its top surface near the edge of the top surface.

When the cap is fully assembled it is designed to hold the saw blade securely in place. The saw blade can be put in and withdrawn by twisting the top cap. When the top cap is twisted in one direction and the saw blade is placed within the slot between the cylindrical extensions, a cavity in the sidewall of the top cap allows the rod to loosen and the saw blade is pushed past the rod. When the top cap is twisted in the other direction the rod is forced forward by the side wall of the top cap and fits securely in the opening in the saw blade holding the saw blade securely in place. When the top cap is twisted in one direction, the spring-loaded piston moves from one indention to the second indention and snaps into the second indention because of the spring tension. When the top cap is twisted in the other direction the piston moves from the indention it was in to the other indention and snaps in place to hold the top cap securely in place.

The saw blade is a standard saw blade that is used in many hand held saws. It can be bought in almost any hardware store. Saw blade at its bottom has an arm. A little ways above the bottom, saw blade has an opening.

The cap assembly can also be hooked to a limb attachment. The limb attachment is designed to hook the cap assembly and extend the range of the saw. This enables the user to cut limbs far higher up in a tree. The limb attachment is a tube. One end of the tube has threads on its outside. These threads are design to screw into the cap assembly. On the other end of the tube the limb assembly has a threaded inner surface. This threaded inner surface is designed to thread to a limb. The limb attachment is placed over the end of a limb and threaded onto the limb. The limb attachment has knurl on its outer surface to allow easier gripping and twisting upon the limb.

The portable handsaw is designed for use in outdoor activities. It is an efficient design for a small hand saw where the blade can be bought in any hardware store. The blades can be stored in a waterproof compartment in the hollow handle. The saw can also be attached to a tree limb to extend its reach.

BRIEF DESCRIPTION OF THE DRAWINGS

FIG. 3 is a perspective view of the invention with the saw blade on top and arrows show how the saw blade is placed on top of the handle.

FIG. 4 is a perspective view of the invention with the saw blade and arrows show how the saw blade is removed from the top of the handle.

DETAILED DESCRIPTION OF THE PREFERRED EMBODIMENT

Figures 1, 2:
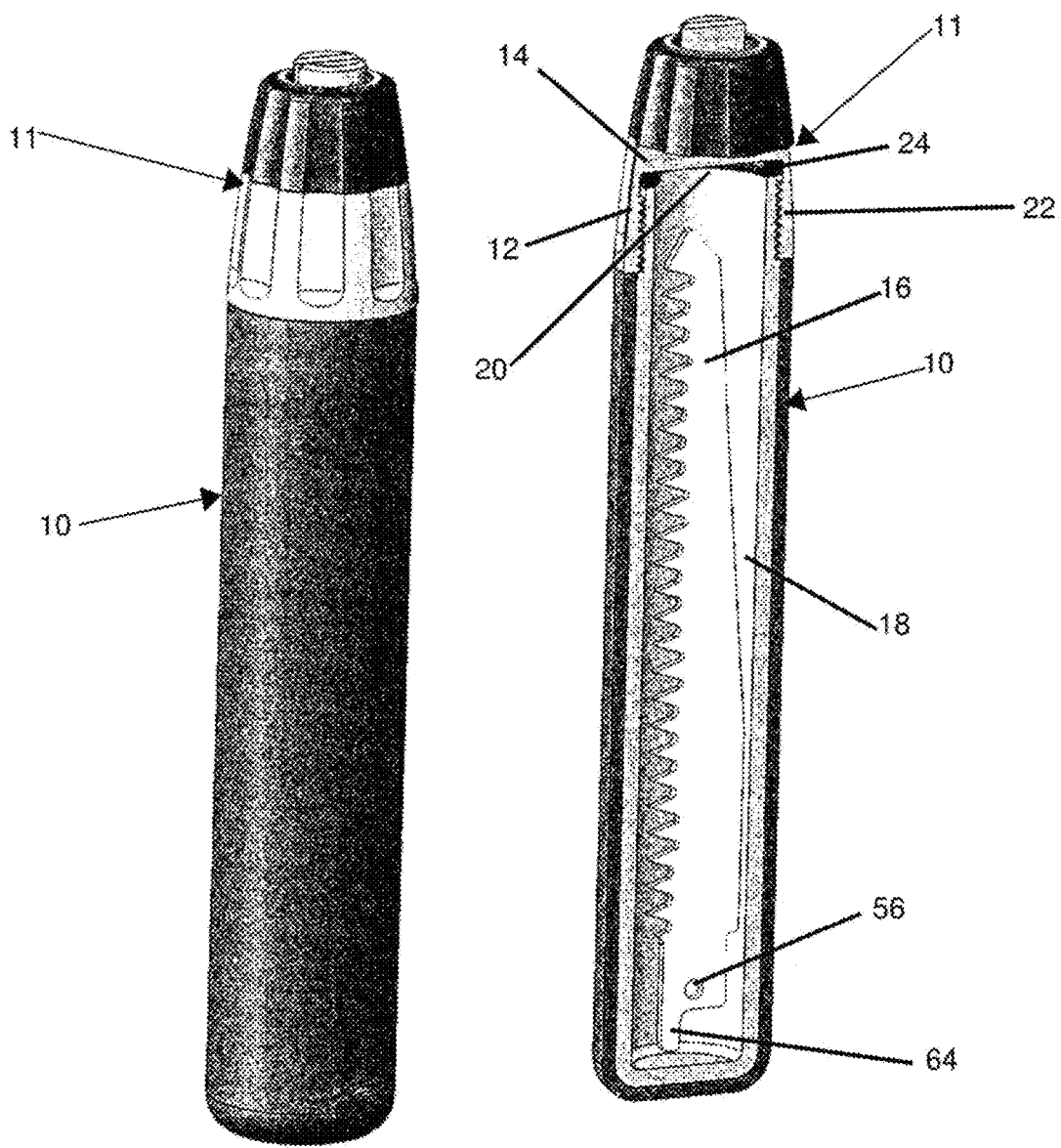
FIG. 1 is a perspective view of the handle of the invention without the saw blade on top.
FIG. 2 is a cut away view of the invention showing a saw blade within the hollow handle.

FIG. 1 shows the invention without the saw blade being attached. FIG. 1 shows the handle 10, and the cap assembly 11, which is, comprised of the threaded portion 12 and the top cap 14. FIG. 2 is a cutaway view of the invention without the saw blade 16 being attached. FIG. 2 shows the handle 10 and the threaded portion 12 and the top cap 14. In FIG. 2 the handle 10 is cutaway showing that within handle 10 there is a cavity 18 in which a saw blade 16 can fit. Several saw blades 16 can fit in cavity 18.

The cavity 18 has a closed bottom and an opening 20 at the handle's 10 top. The opening 20 is adapted such that the saw blade 16 will pass through and into the handle 10 for storage. The handle 10 has threads 22 at its top. The threaded portion 12 is threaded such that it will thread over the threads 22 of the handle 10. On top of opening 20 of the handle 10 an O-ring 24 is placed. This O-ring 24 is compressed and forms a watertight seal when the threaded portion 12 is threaded on handle 10.

FIG. 3 is a perspective view of the invention with the saw blade 16 on top. FIG. 3 shows how the saw blade 16 is placed on handle 10. Saw blade 16 is placed in slot 26 and the top cap 14 is twisted clockwise to lock the saw blade 16 in place. FIG. 4 shows how the saw blade 16 is removed from handle 10. In FIG. 4 the top cap 14 is twisted counterclockwise and the saw blade 16 is removed.

Saw blade 16 shown in FIGS. 2, 3, and 4 is a common saw blade used with the typical handsaw. One end of the saw blade 16 has teeth. The saw blade 16 at its bottom has an arm 64. A little way above the bottom, the saw blade 16 has an opening 56.

Figure 5:
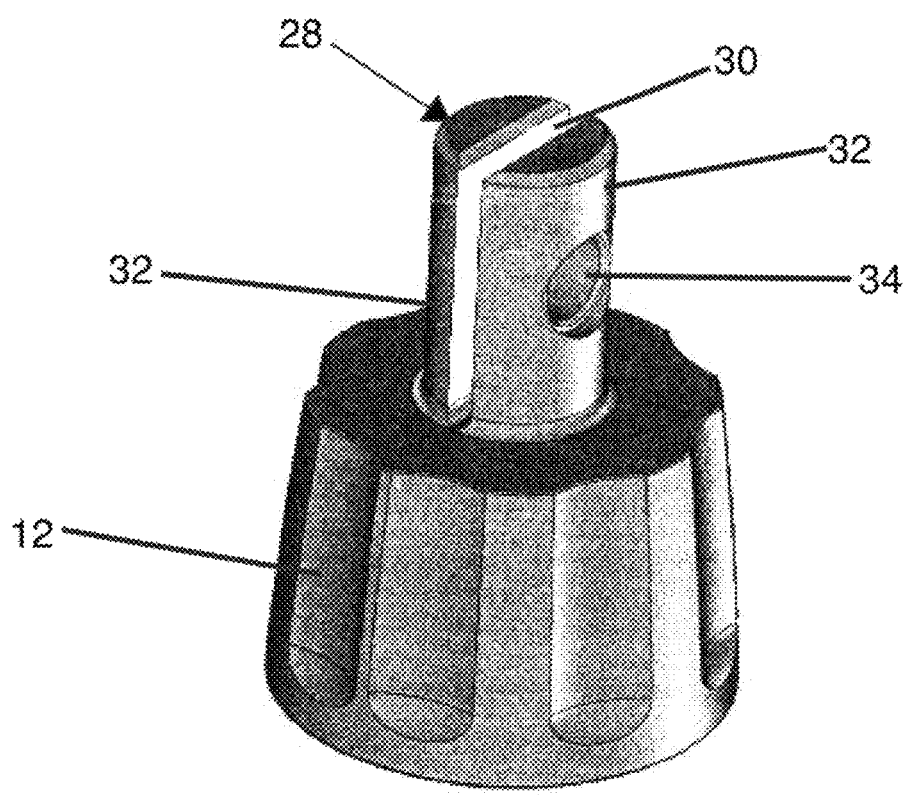
FIG. 5 is a perspective view of the thread portion.

FIG. 5 is a perspective view of the threaded portion 12. The threaded portion 12 threads on top of the handle 10. Extending from the top of the threaded portion 12 is a cylindrical extension 28. The cylindrical extension 28 has a slot 30 that extends through the center of the cylindrical extension 28 from the top of the cylindrical extension 28 to the top of the threaded portion 12. The slot 30 splits the cylindrical extension 28 into two wings 32. The slot 30 is approximate the width of the saw blade 16. The saw blade 16 fits within the slot when the saw blade 16 is placed upon the handle for use. Within one wing 32 an opening 34 is bored completely through wing 32.

Figure 6:
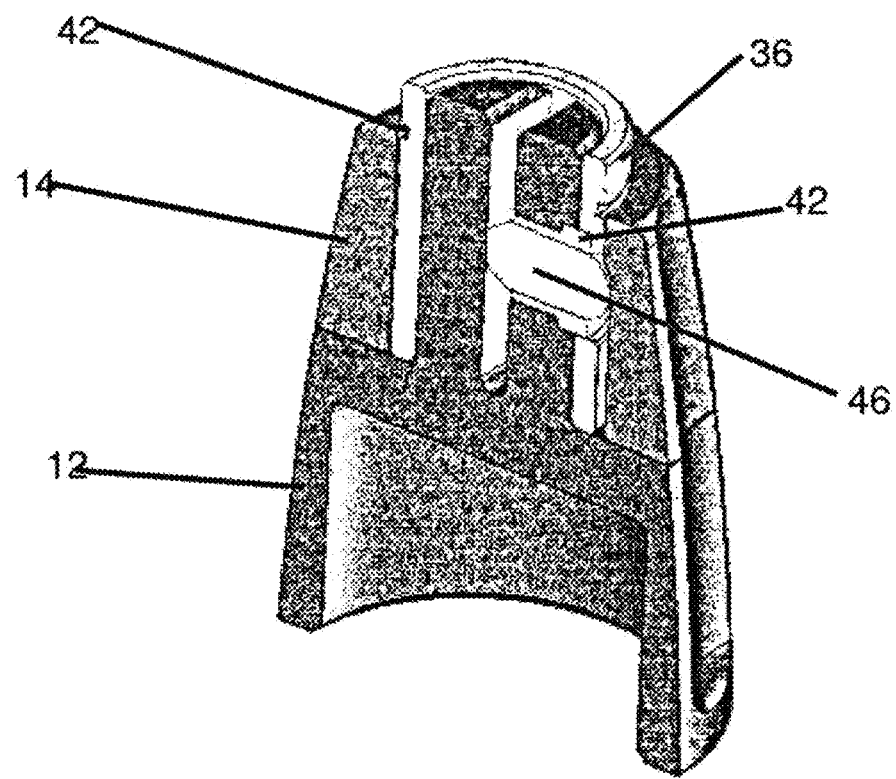
FIG. 6 is a perspective view of the cap assembly.
Figure 7:
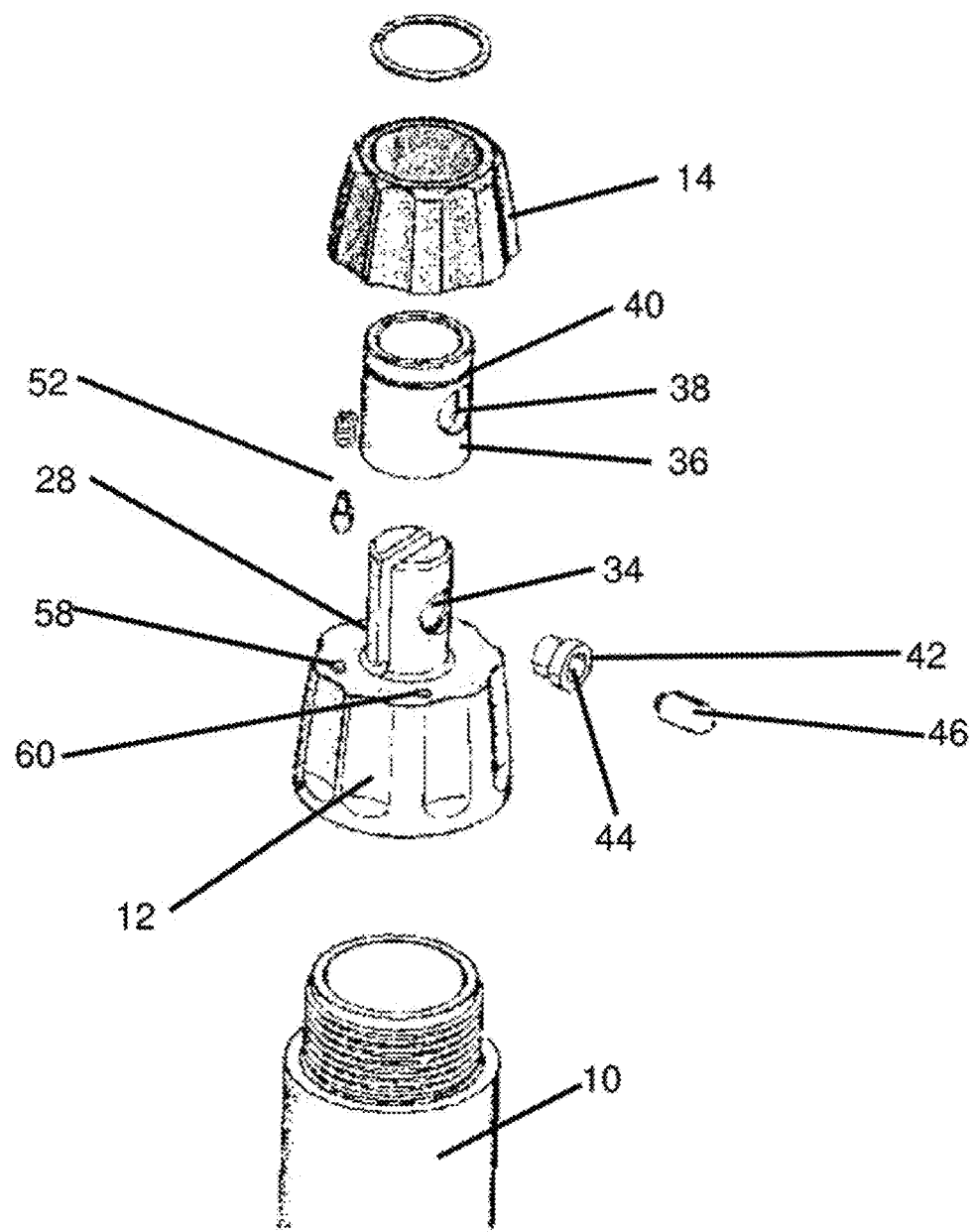
FIG. 7 is an exploded view of the cap assembly.

FIGS. 6 and 7 shows the structure of the top cap 14. Over top of cylindrical extension 28, a cylindrical piece 36 is placed. Cylindrical piece 36 is a cylindrical tube. Completely through one side of cylindrical piece 36 an opening 38 is bored. Opening 38 aligns with opening 34. Around the top of cylindrical piece 36 a groove 40 is bored. A lock ring 43 fits within groove 40.

A second cylindrical piece 42 is adapted to fit within opening 38 in the cylindrical piece 36. Second cylindrical piece 42 is cantilever in shape in that the outer circumference of the top portion of the second cylindrical piece 42 is a larger than the outer circumference of the bottom of the second cylindrical piece 42. The second cylindrical piece 42 fits within the opening 38 in the first cylindrical piece 36. Within the opening 44 that passes through the second cylindrical piece 42 along the length of the second cylindrical piece 42 a rod 46 is placed. The rod 46 is cylindrical in shape with the front being a truncated cone and the backend semicircular.

Figure 8:
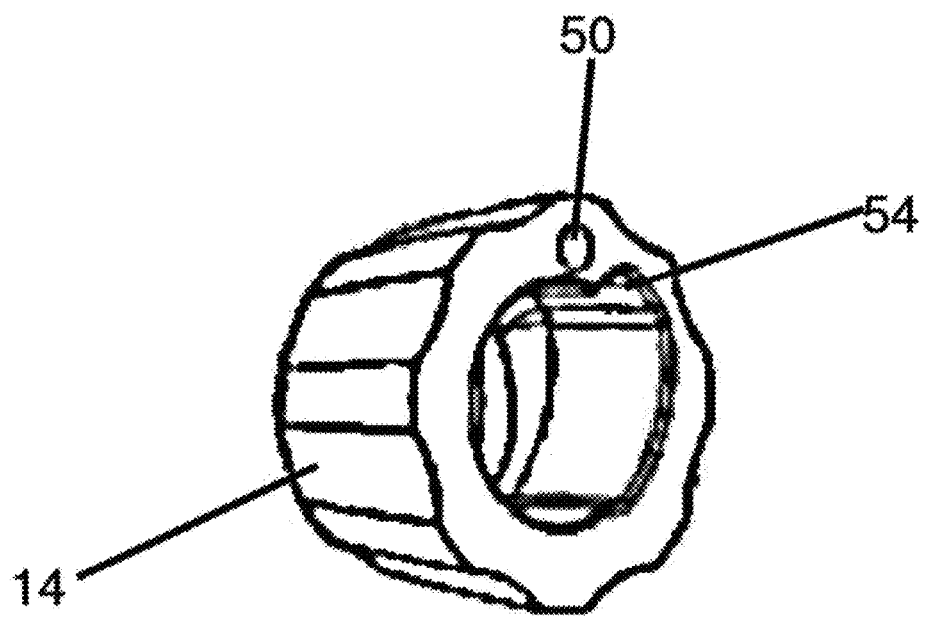
FIG. 8 is a bottom perspective view of the top cap.

A top cap 14 fits over the assembly of the threaded portion 12, the cylindrical piece 36, the second cylindrical piece 42 and the rod 46. The top cap 14 is held in place on top of the treaded portion 12 by lock ring 43. The top cap 14 has an open top allowing access to the cylindrical extension 28 and the first cylindrical piece 36. On the outer edge of the bottom of the top cap 14, there is a cavity 50 shown in FIG. 8. Within the cavity 50, a spring tension piston 52 is placed. The spring tension piston 52 has a rounded bottom. This rounded bottom is designed to fit within indentions 58 and 60 on the top of the threaded portion 12. The threaded portion 12 has two indentions 58 and 60 on its top surface near the edge of the threaded portion 12. When the cap assembly 11 is fully assembled, it is designed to hold the saw blade 16 securely in place. The saw blade can be put on and withdrawn by twisting the top cap 14. When the top cap 14 is twisted in one direction, the saw blade 16 is placed within the slot 30 between the wings 32 of the cylindrical extension 28. A rod cavity 54 in the sidewall the top cap 14 shown in FIG. 8 allows the rod 46 to loosen and the saw blade 16 pushes past the rod 46. When the top cap 14 is twisted in the other direction the rod 46 is forced forward by the side walls of the top cap 14 and fits securely in the opening 56 in the saw blade 16 holding the saw blade 16 in place. When this top cap 14 is twisted in one direction the piston 52 moves from the first indention 58 to the second indention 60 and snaps into the second indention 60 and securely holds the top cap 14 in place. When the top 14 is twisted in the opposite direction the piston 52 moves from the second indention 60 to the first indention 58 and allows the saw blade 16 to be removed.

Figure 9:
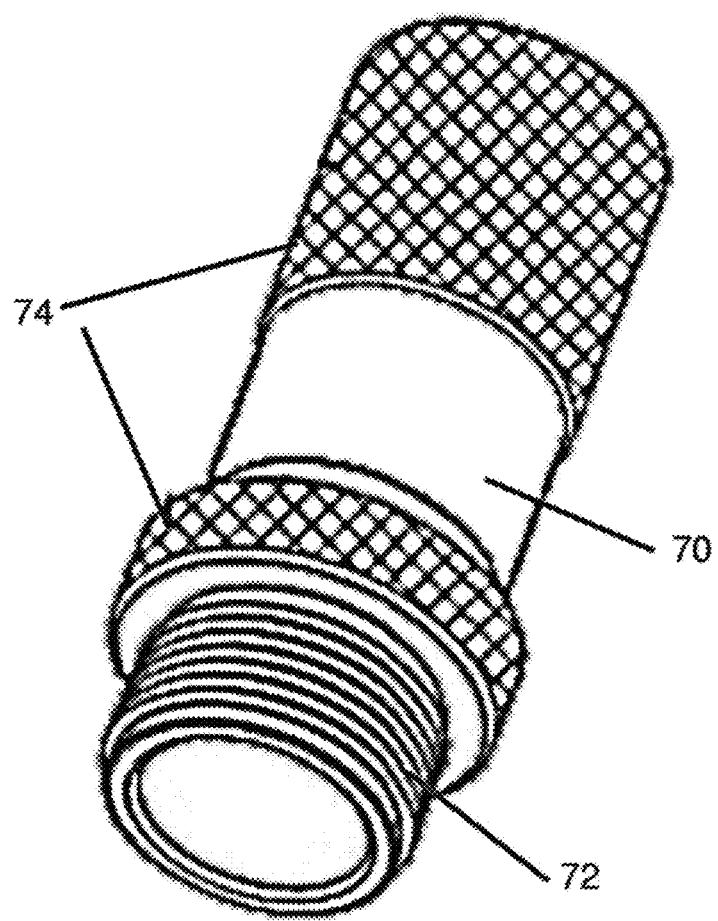
FIG. 9 is a perspective of the limb attachment.
Figure 10:
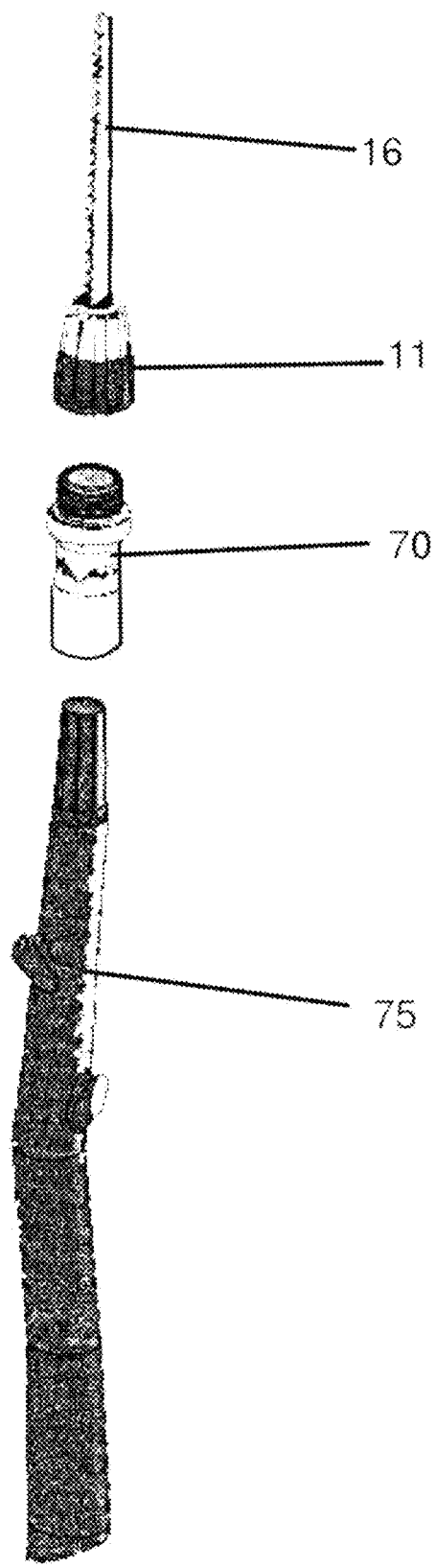
FIG. 10 is an exploded view of a limb being used to extend the reach of the saw.
Figure 11:
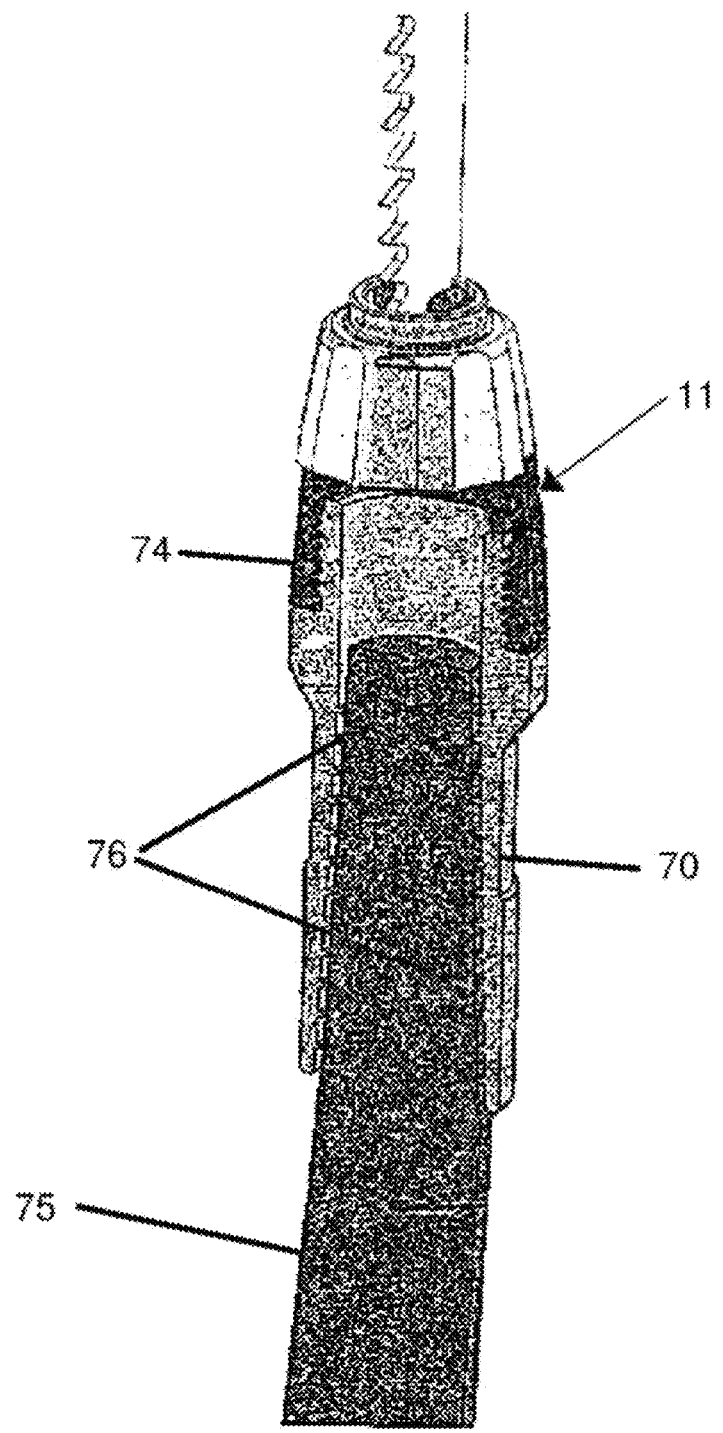
FIG. 11 is a view of the limb being used to extend the reach of the saw.

The cap assembly 11 can also be hooked to the limb attachment 70. The limb attachment 70 is shown in FIG. 9. Limb attachment 70 is a cylindrical piece of pipe. On the outside circumference at one end is a set of threads 72 that are designed to thread within the threads on the bottom of the cap assembly 11. On the outer surface of the limb attachment 70 are knurl 74. On the end opposite threads 72 on the inner diameter of limb attachment 70 are a set of widely spaced threads 76 as shown in FIG. 11. FIGS. 10 and 11 show the use of the limb attachment 70 with the cap assembly 11. FIG. 10 shows the cap assembly 11, the limb attachment 70 and a limb 75. In FIG. 10 the limb 75 has been slightly whittled on the end to fit within limb attachment 70. However, any limb 75 of an appropriate diameter could be used. FIG. 10 shows the cap assembly 11, the limb attachment 70 and the limb 75 as they are used. Cap assembly 11 is screwed upon the limb attachment 70 by threading threads 72 into the threads at the bottom of the cap assembly 11. Then the cap assembly 11 and the limb attachment 70 are screwed onto the limb 75. This allows an adventurer to cut an appropriate limb much farther up in the tree.

Figure 12:
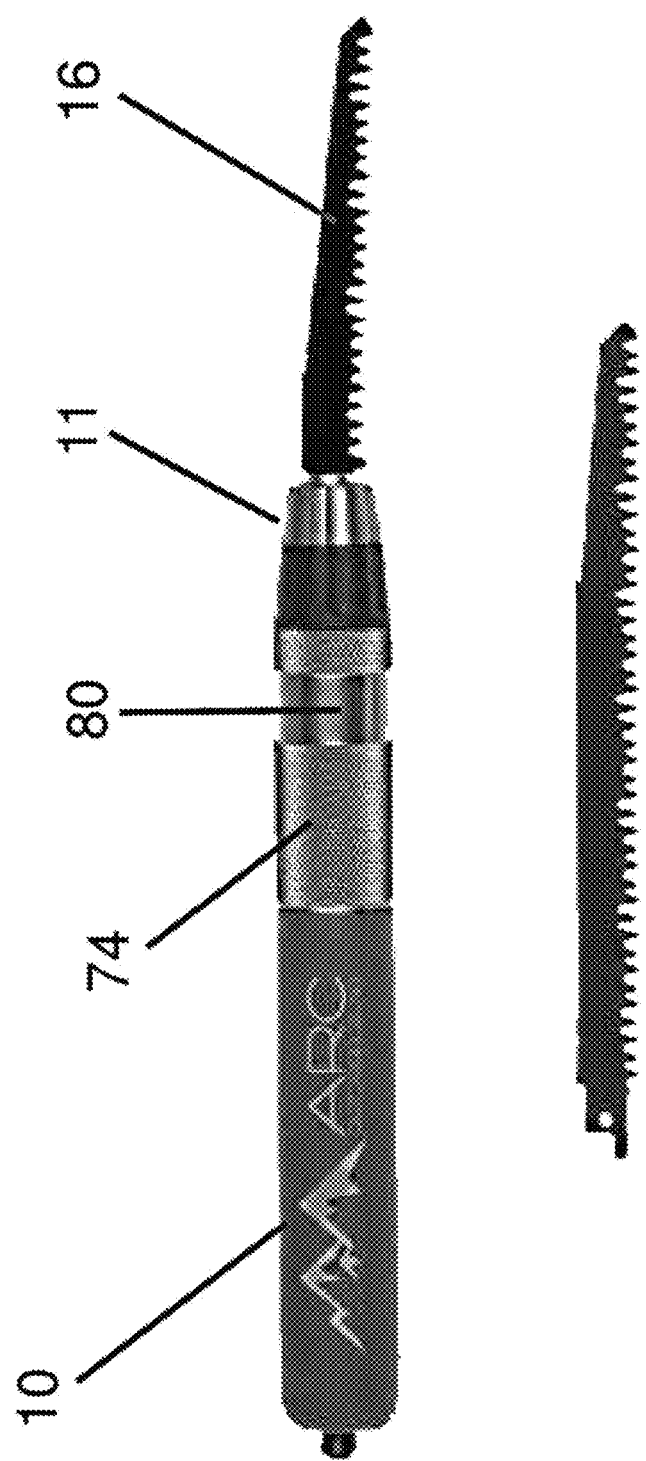
FIG. 12 is a side view of another embodiment of the limb attachment with a handle.
Figure 13:
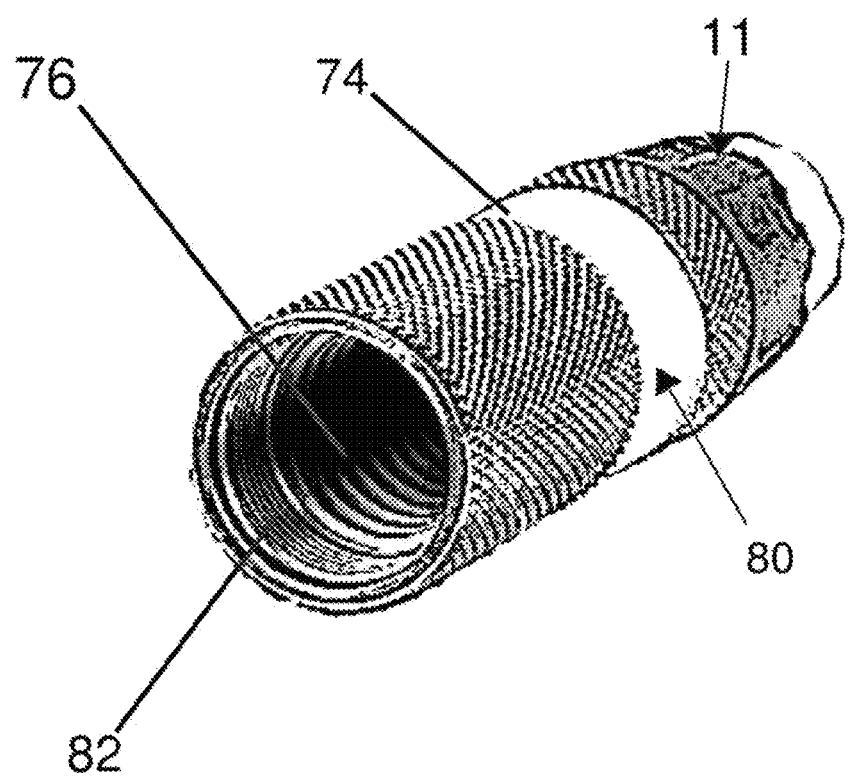
FIG. 13 is a perspective view of the limb attachment of FIG. 12.
Figure 14:
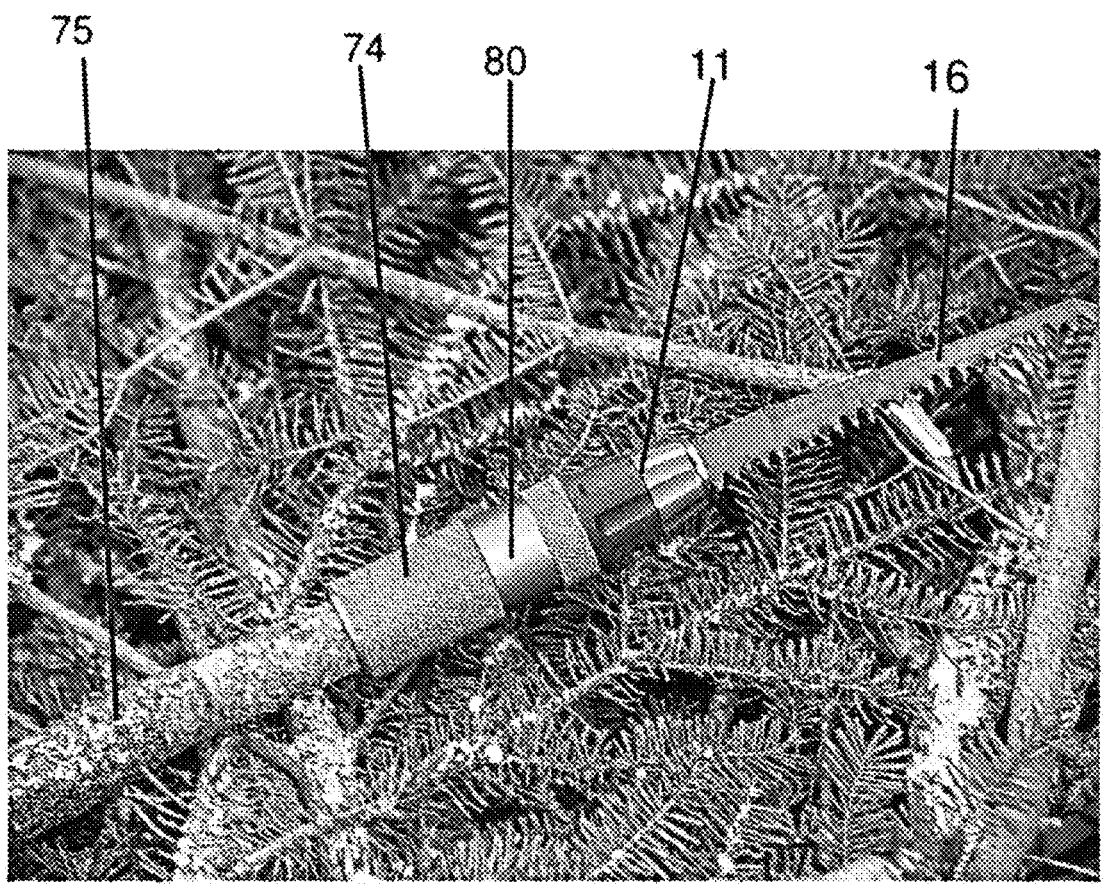
FIG. 14 is a view of the limb being used to extend the reach of the saw for the limb attachment of FIG. 12.

FIG. 12 shows another embodiment of the limb attachment 80. In this figure limb attachment 80 is shown to be attached to the handle 10 and the cap assembly 11. Limb attachment 80 is the same as limb attachment 70 accept at its bottom is a second set of threads 82 that thread over the threads 22 of the handle 10 as shown in FIG. 13. Limb attachment 80 is a cylindrical piece of pipe. On the outside circumference at one end is a set of threads 72 that are designed to thread within the threads on the bottom of the cap assembly 11. On the outer surface of the limb attachment 80 are knurl 74. On the end opposite threads 72 there are two sets of threads, widely spaced threads 76 and second set of threads 82 as shown in FIG. 13. On the inner diameter of the limb attachment 80 at the bottom of the limb attachment 80 there is a second set of threads 82 on the inner diameter of limb attachment 80. The second set of threads 82 are designed to thread over the threads 22 of the handle 10 as shown in FIG. 13. Above the second set of threads 82 there is a set of widely spaced threads 76 as shown in FIG. 13. FIG. 14 shows the cap assembly 11, the limb attachment 80 and a limb 75. FIG. 14 shows the cap assembly 11, the limb attachment 80 and the limb 75 as they are used. Cap assembly 11 is screwed upon the limb attachment 80 by threading threads 72 into the threads at the bottom of the cap assembly 11. Then the cap assembly 11 and the limb attachment 80 are screwed onto the limb 75. This allows an adventurer to cut an appropriate limb much farther up in the tree.

The invention claimed is:

1. A saw handle extender that enables a saw with a cap assembly (11) whose top (14) is designed for attaching a saw blade (16) and whose bottom has a threaded female opening (12) to be attached to the saw handle extender, wherein the saw handle extender comprising:

a cylindrical tube (70) whose top has a threaded outer circumference (72) that is adapted to fit within the threaded female opening of the cap assembly (11); and said cylindrical tube (70) has a bottom opening and said bottom opening on its inter-diameter has a set of widely spaced threads (76); and a tree limb (75) has a diameter that is approximately the same as the inter-diameter of the bottom opening of the cylindrical tube (70) such that it enables the tree limb (75) to be screwed into the bottom opening of the cylindrical tube (70) to produce a secure attachment of the tree limb (75) to the cylindrical tube (70).

2. A saw handle extender as in claim 1 further comprising knurls (74) on an outer surface of the cylindrical tube (70).

3. A saw handle extender as in claim 1 wherein the tree limb (75) is whittled so that it fits better into the bottom opening of the cylindrical tube (70).

4. A saw handle extender as in claim 1 further comprising a second set of threads (82) beneath the widely spaced threads (76) enabling the saw handle extender to be attached to a handle (10) when the tree limb (75) is not attached to the cylindrical tube (70).

5. A saw whose handle is a tree branch comprising;

a cap assembly (11) to which a saw blade (16) is attached and whose bottom has a threaded female opening;

a cylindrical tube (70) whose top has a threaded outer circumference (72) that is adapted to fit within the threaded female opening of the cap assembly (11);

said cylindrical tube (70) has a bottom opening and said bottom opening on its inter-diameter has a set of widely spaced threads (76); and a tree limb (75) that has a diameter that is approximately the same as the inter-diameter of the bottom opening of the cylindrical tube (70) such that it enables the tree limb (75) to be screwed into the bottom opening of the cylindrical tube (70) to produce a secure attachment of the tree limb (75) to the cylindrical tube (70).

6. The saw as in claim 5 wherein a second set of threads (82) beneath the widely spaced threads (76) and adapted to be attached to a handle (10) when the tree limb (75) is not attached to the cylindrical tube (70).

7. The saw as in claim 5 wherein the saw blade (16) has teeth; an arm (64) extends from the saw blade's bottom, and an opening (56) at the bottom of the saw blade (16) above the arm (64).

8. The saw as in claim 5 wherein the saw blade (16) is releaseably attached to the cap assembly (11).

9. The saw as in claim 8 wherein the cap assembly (11) comprises a threaded portion (12); a top cap (14), and said threaded portion (12) and the top cap (14) work in concert to allow the saw blade (16) to be releaseably attached to the cap assembly (11).

10. The saw as in claim 9 wherein the threaded portion (12) comprises a bottom piece with a top and a bottom, and the bottom has a threaded female opening and the top has an outer ridge;

a cylindrical extension (28) with a top and a center, and the cylindrical extension (28) extending from the top of the bottom piece;

the cylindrical extension (28) has a slot (30) that extends through the center of the cylindrical extension (28) from the top of the cylindrical extension (28) to the top of the bottom piece;

the slot (30) is approximate the width of the saw blade (16) and divides the cylindrical extension (28) into two wings (32);

an opening (34) within one of the wings (32);

a first cylindrical piece (36) with a side that is adapted to fit over the cylindrical extension (28) and with an opening (38) in the side of the first cylindrical piece (36);

the first cylindrical piece (36) has a groove (40) around its outer circumference and the groove (40) is near the top of the first cylindrical piece (36);

said opening (38) in the side of the first cylindrical piece (36) aligns with the opening (34) in one of the wings (32);

a second cylindrical piece (42) that fits within the opening (34) in one of the wings (32);

a rod (46) with a front and a back that fits within the second cylindrical piece (42), said front is a truncated cone, and said back is semicircular; and two indentions (58,60) on the outer ridge of the bottom piece.

11. The saw as in claim 10 wherein the top cap (14) comprises:

a truncated cone cap with a top and a bottom with a center opening that passes from the top to the bottom producing a side wall, and said center opening is of sufficient size that the cylindrical extension (28) and the first cylindrical piece (36) can pass;

a cavity (50) on a bottom edge of the truncated cone cap;

a spring and a spring tension piston (52) within the cavity (50); and a hollow in the side wall of the truncated cone cap.

12. The saw as in claim 11 wherein the cap assembly (11) is assembled by placing the first cylindrical piece (36) over the cylindrical extension (28) and lining up the opening (38) in the first cylindrical piece (36) with the opening (34) in one of the wings (32) of the cylindrical extension (28) and placing the second cylindrical piece (42) through the openings (34,38) in the cylindrical extension (28) and in the first cylindrical piece (36) and then the rod (46) is placed in the second cylindrical piece (42) with the front facing the slot (30) in the cylindrical extension (28) and then the top cap (14) with the spring and the spring tension piston (52) within the cavity (50) is placed on the top of the threaded portion (12) and over the cylindrical extension (28) with said spring tension piston (52) fitting in one of the two indentions (58,60), and the first cylindrical piece (36) passing through the center opening of the top cap (14), and the first cylindrical piece (36) protrudes from the top of the top cap (14) and a lock ring (43) is placed in the groove (40) of the first cylindrical piece (36) for holding the top cap (14) in place on top of the threaded portion (12); and wherein the saw blade (16) is place in the cap assembly (11) by placing the saw blade (16) in the slot (30) and then twisting the top cap (14) so that the rod (46) which is in the hollow within the top cap (14) will move out of the hollow and be pushed into the opening (56) in the saw blade (16), and the saw blade (16) can be removed by twisting the top cap (14) so that the rod (46) moves into the hollow which loosen the rod (46) and allows the saw blade (16) to be removed.

13. A saw comprising:
a saw blade (16);
a threaded portion (12);
a top cap (14);
said threaded portion (12) and the top cap (14) work in concert to allow the saw blade (16) to be releasably attached thereto;
a handle (10/75);

the threaded portion (12) comprising:

a bottom piece with a top and a bottom, and the bottom has a threaded female opening and the top has an outer ridge;

a cylindrical extension(28) with a top and a center, and the cylindrical extension (28) extending from the top of the bottom piece;

the cylindrical extension (28) has a slot (30) that extends through the center of the cylindrical extension (28) from the top of the cylindrical extension (28) to the top of the bottom piece;

the slot (30) is approximate the width of the saw blade (16) and divides the cylindrical extension (28) into two wings (32);

an opening (34) within one of the wings (32);

a first cylindrical piece (36) with a side that is adapted to fit over the cylindrical extension (28) with an opening (38) in the side of the first cylindrical piece (36);

the first cylindrical piece (36) has a groove (40) around its outer circumference and the groove (40) is near the top of the first cylindrical piece (36);

said opening (38) in the side of the first cylindrical piece (36) aligns with the opening (34) in one of the wings (32);

a second cylindrical piece (42) that fits within the opening (34) in one of the wings (32);

a rod (46) with a front and a back that fits within the second cylindrical piece (42), said front is a truncated cone, and said back is semicircular; and two indentions (56/60) on the outer ridge of the bottom piece.

14. The saw as in claim 13 wherein the top cap (14) comprises:

a truncated cone cap with a top and a bottom with a center opening that passes from the top to the bottom producing a side wall and said center opening is of sufficient size that the cylindrical extension (28) and the first cylindrical piece (36) can pass;

a cavity (50) on a bottom edge of the truncated cone cap;

a spring and a spring tension piston (52) within the cavity (50); and a hollow in the side wall of the truncated cone cap.

15. The saw as in claim 14 wherein the top cap (14) is assembled by placing the first cylindrical piece (36) over the cylindrical extension (28) and lining up the opening (38) in the first cylindrical piece (36) with the opening (34) in one of the wings (32) of the cylindrical extension (28) and placing the second cylindrical piece (42) through the openings (34,38) in the cylindrical extension (28) and in the first cylindrical piece (36) and then the rod (46) is placed in the second cylindrical piece (42) with the front facing the slot (30) in the cylindrical extension (28) and then the top cap (14) with the spring and the spring tension piston (52) within the cavity (50) is placed on the top of the threaded portion (12) and over the cylindrical extension (28) with said spring tension piston (52) fitting in one of the two indentions (58,60) and the first cylindrical piece (36) passing through the center opening of the top cap (14), and the first cylindrical piece (36) protrudes from the top of the top cap (14) and a lock ring (43) is placed in the groove (40) of the first cylindrical piece (36) for holding the top cap (14) in place on top of the threaded portion (12);

wherein the saw blade (16) is place in the top cap (14) by placing the saw blade (16) in the slot (30) and then twisting the top cap (14) so that the rod (46) which is in the hollow within the top cap (14) will move out of the hollow and be pushed into the opening (56) in the saw blade (16), and the saw blade (16) can be removed by twisting the top cap (14) so that the rod (46) moves into the hollow which loosen the rod (46) and allows the saw blade (16) to be removed.

16. The saw as in claim 15 wherein the handle (10) is hollow and allows the saw blade (16) to be stored within the handle (10).

17. The saw as in claim 15 further comprising:
- a cylindrical tube (70) whose top has a threaded outer circumference (72) that is adapted to fit within the threaded female opening of the threaded portion (12);
- said cylindrical tube (70) has a bottom opening, and said bottom opening on its inter-diameter has a set of widely spaced threads (76); and
- the handle (75) is a tree limb (75) that has a diameter that is approximately the same as the inter-diameter of the bottom opening of the cylindrical tube (70) such that it enables the tree limb (75) to be screwed into the bottom opening of the cylindrical tube (70) to produce a secure attachment of the tree limb (75) to the cylindrical tube (70).

18. The saw as in claim 17 further comprising:
- a second set of threads (82) beneath the widely spaced threads (76); and
- a second handle (10) hat can be attaches to the second set of threads (82) when the tree limb (75) is removed as the handle.

19. The saw as in claim 17 wherein knurls (74) on the outer surface of the cylindrical tube (70).

* * * * *